United States Patent [19]

Barchas

[11] 3,839,220
[45] Oct. 1, 1974

[54] MICROCAPSULES FOR USE IN PRESSURIZED SYSTEMS

[75] Inventor: Myron Barchas, New York, N.Y.

[73] Assignee: The Mennen Company, Morristown, N.J.

[22] Filed: Nov. 8, 1971

[21] Appl. No.: 196,811

Related U.S. Application Data

[63] Continuation-in-part of Ser. No. 770,037, Oct. 23, 1968, abandoned.

[52] U.S. Cl. ............... 252/305, 424/73, 257/188.3, 252/186, 424/62, 161/DIG. 5, 206/86, 260/2.5
[51] Int. Cl..... C09k 3/30, A61l 13/00, C01b 13/00
[58] Field of Search .. 252/305; 161/DIG. 1, DIG. 5; 156/145, 146, 147; 424/62, 73

[56] References Cited
UNITED STATES PATENTS
2,524,590   10/1950   Bae ..................................... 252/305
3,679,102   7/1972   Charle et al. ....................... 252/305

OTHER PUBLICATIONS

Herzka, International Encyclopedia of Pressurized Packaging, (Aerosols), 1965, pp. 377–379.

National Cash Register Corp., Factory News, Oct. 1959, pp. 14–16.

Primary Examiner—John D. Welsh
Attorney, Agent, or Firm—Davis, Hoxie, Faithfull & Hapgood

[57] ABSTRACT

Active substances are stored in pressurized storage systems encapsulated in microcapsules having internal pressures sufficient to burst the microcapsules, and thus release the other substances, upon removal from the system.

18 Claims, No Drawings

MICROCAPSULES FOR USE IN PRESSURIZED SYSTEMS

This application is a continuation-in-part of my co-pending application Ser. No. 770,037, filed Oct. 23, 1968 and now abandoned.

This invention is concerned with systems for storing active substances under conditions such that their activity is suppressed, and in particular with systems for storing active substances in the presence of other active substances under conditions such that no reaction will occur between the two active substances. Further, the invention is concerned with systems in which an active substance may be stored in a pressured container, such as an aerosol container, under conditions such that upon release or discharge from the container the active substance can react with another active substance, or to effect such other physical or chemical change as may be desired.

In recent years, in a number of areas, it has become desirable to store active substances in pressurized systems under conditions such that their activity vis-a-vis other elements of the system is suppressed or nullified. Such areas include the fields of shaving preparations, hair dyes, shampoos, rinses, bleaches and other cosmetic products, as well as aerosol dispensed polyurethane foams, epoxy adhesives, and nylon films. According to present techniques used in these cases, one or more reactants or catalysts are stored in separate compartments and only brought into contact with one another immediately before use, separate storage of such active ingredients being necessary to prevent premature combination or reaction. Many of these proposals have failed to reach commercial fruition because of the complexity of available separate storage systems.

One example, which has only recently reached widespread commercial utility, is the so-called hot-shave aerosol form. Such aerosols are packaged in a two-zone container, with one zone containing a propellant, a soap or detergent (with the other ingredients common to shave creams), and a reducing agent such as potassium sulfite, potassium theiosulfate or thiourea, as an active substance; while the other zone contains, in addition to other components and propellant, a second active substance, viz., an oxidant such as hydrogen peroxide. On discharge the oxidant and reducing agent combine and react exothermically to provide the sensible heat of the hot shave. See, for example, U.S. Pat. No. 3,341,418. Such aerosol systems are conventionally packaged in containers having separate storage zones and a complex valve system for discharge. Examples of these two-zone containers and valves are shown in numerous U.S. patents, see for example U.S. Pat. Nos. 2,973,885; 3,045,925; 3,241,722; and 3,326,416.

Other instances in which multizone storage of active ingredients is indicated include:

1. permanent hair dyes, where the two separate active ingredients may be, for example (a) dye intermediates such as aromatic amines and phenols, and (b) a developer such as hydrogen peroxide, sodium percarbonate or potassium percarbonate;

2. hair bleaches, where the separate active ingredients may be, for example, (a) aqueous ammonia and (b) aqueous hydrogen peroxide, and optionally (c) a toner dye as an additional component;

3. epoxy adhesives, where the two separate active ingredients may be, for example (a) a polyamide resin and (b) a bisphenol A epichlorohydrin-based epoxy resin;

4. polyurethane foams, where the two separate active ingredients may be, for example, (a) a glycol or polyether, such as hexylene glycol, and (b) a diisocyanate such as toluene diisocyanate;

5. spray-on nylon coatings, where the two separate active ingredients may be, for example (a) an acylhalide, such as adipoyl chloride, and (b) hexamethyl diamine;

6. spray-on polyurea coatings, where the two separate active ingredients may be, for example, (a) hexamethylenediamine and (b) phosgene gas in carbon tetrachloride; and 7. pressure-dispersed auto body putty formulations, where the separate active ingredients may be, for example, (a) a liquid polyester resin and inhibitor and (b) an organic peroxide such as benzoyl peroxide.

The present invention provides a means through which two active substances (including substances mutually reactive with one another as in any of the above cases) can be stored in a single zone pressurized container and maintained isolated from one another until their release from the container.

In the text which follows, the term "active substance" includes both substances which will engage in, promote or retard a chemical reaction, and substances which, while not actually entering into a chemical reaction, will achieve a physical change in termperature, color, odor, phase, viscosity, solubility or the like. Some examples of active substances have been cited above.

In the present text, the term "microcapsules" is used in the sense familiar to the art to mean capsules of minute size, e.g., from less than 200, say from 3 to about 450 microns, comprising a solid wall (which may be of a single layer or multilayered) enclosing a material different from the wall. See for example NCR "Factory News" October 1959, p. 14. The present invention finds its greatest application in aerosol containers and the limit of 450 microns is indicated by the structure of conventional aerosol valves. However, the invention is capable of other applications and in some of these, such as pop-top containers, there is no specific upper limit on microcapsule size.

In accordance with the invention, active substances are encapsulated in microcapsules along with a bursting fluid component and stored in a container, e.g., an aerosol container, under pressure. The nature and quantity of bursting fluid are selected so that the pressure inside the capsules (due in most cases solely to the vapor pressure of the bursting fluid), under the conditions of storage, is equal to or less than the pressure in the container, but substantially greater than the pressure outside the container under use conditions so that when released from the container the microcapsules are caused to burst or explode through the agency of the bursting fluid, releasing the active substance to react with other active substances or to exert some other desired physical effect.

Since storage of the microcapsules in their container is under pressure, there must obviously be some fluid medium present in the container external to the microcapsules to maintain the external pressure. In the case of aerosol systems, this fluid medium is normally an aerosol propellant, typically one of those listed below, with, possibly, other materials including materials capable of reacting with the encapsulated active material dissolved or dispersed within the propellant. The microcapsules themselves may be dispersed in the fluid medium in a stable suspension or they may be concentrated in an upper or lower layer depending on relative densities of the capsules and the fluid medium.

Obviously, the fluid medium need not be an aerosol propellant if an aerosol spray is not desired. For example, a pop-top container might be pressurized with nitrogen or carbon dioxide. The fluid pressuring medium will normally be present, in part, in the liquid phase. However, the invention includes the case where pressuring liquid is held in a solid adsorbent as in U.S. Pat. No. 3,088,874.

The invention therefore comprises, in one aspect, a system for storing active materials comprising a container, a fluid pressurizing medium in said container, and a multiplicity of microcapsules in said container, each of said microcapsules containing a charge consisting essentially of said active material to be stored and a bursting fluid, said bursting fluid being present in an amount, and having a vapor pressure such that, the pressure inside said microcapsules is not substantially different from the pressure of said fluid medium in said container, but is sufficiently greater than the pressure prevailing outside said container under normal conditions of use, to effect bursting of said capsules upon their removal from said container.

Numerous techniques are available for microencapsulating substances, such as the active ingredients involved here. See for example U.S. Pat. Nos. 2,665,228; 2,800,457; 2,800,458 (U.S. Pat. No. Re. 24,899); 2,846,971; 2,969,330; 2,969,331; 3,015,128; 3,041,289; 3,056,728; 3,091,567; 3,121,698; 3,159,585; and 3,172,878; British Pat. No. 1,091,141; and *Microencapsulation*, a special report published by Management Reports, Boston (1963).

Virtually any kind of compound can be encapsulated in any of a number of encapsulating media, by one or more encapsulating processes. These processes include the simple and complex coacervation processes, the interfacial polymerization process, the organic phase separation method, the exchange process and the meltable dispersion process, all of which are described in the reference noted above.

With reference to the encapsulation of some of the typical active ingredients listed above, for example, solid potassium percarbonate may be encapsulated by the method of U.S. Pat. No. 3,121,698; toluene diisocyanate may be encapsulated by the interfacial polycondensation method; hexamethylenediamine may be encapsulated by the organic phase separation method; and perfume may be encapsulated by the simple coacervation process.

In accordance with this invention, an active ingredient is encapsulated by one of the above procedures or its equivalent. A volatile bursting fluid may then be incorporated into the microcapsules. Preferably this is accomplished by soaking microcapsules containing an active ingredient under high pressure in the bursting fluid while the bursting fluid is in a liquid state until the liquid diffuses into the interior of the microcapsules. The resulting pressurized microcapsules then contain both an activer ingredient and the bursting component. It is of course possible in some instances to prepare similar microcapsules by the reverse procedure, that is, by first encapsulating the bursting fluid and then adding the active ingredient, or by simultaneously encapsulating both the bursting component and the active ingredient.

As indicated above, the bursting liquid must be selected, having regard to the other components of the system, so that its vapor pressure under normal storage conditions is equivalent to, or not substantially different from (and in any case not substantially greater than) the pressure in the container but is sufficiently greater than the pressure outside the container under normal use conditions to burst the capsule walls. Obviously the numerical values of the pressures will vary substantially depending on the use intended, as well as on the material shape and uniformity of the capsule walls. The internal microcapsule pressure will roughly be the same as the container pressure. This internal pressure is for the most part equal to the vapor pressure of the bursting fluid, since for the most part the active material will be solid or liquid of low volatility and its contribution to the internal capsule pressure will be negligible, and hence the internal capsule pressure will usually be from 10 psig to 96 psig. Conventional aerosol containers have internal pressures of this order, depending on the propellants used, and, of course, the prevailing temperature. On the other hand, for applications such as underwater or deep-sea operations, or for operations in outer space, the pressures in the container and hence in the microcapsules may vary very greatly indeed, from this norm. For example, the sea water pressure at a depth of 1,000 feet is 443 psig. and if it was intended to use the invention at such depths, the container pressure and the microcapsule pressure should be 10 psig. to 100 pounds above that to secure propulsion and explosion of the capsule. Conversely, in a vacuum, e.g., in outer space, the pressure required for the container and capsules could be on the order of 0–2 psig. Obviously, therefore, hard and fast numerical limits cannot be defined.

For most purposes, the bursting component can be selected from those materials conventionally used as aerosol propellants. Such propellants include the fluorocarbons, such as fluorocarbon 11 (trichlorofluoromethane) fluorocarbon 14 (tetrafluoromethane), fluorocarbon 21 (dichlorofluoromethane), fluorocarbon 22 (chlorodifluoromethane), fluorocarbon 23 (fluoroform), fluorocarbon 113 (trichlorotrifluoroethane), fluorocarbon 114 (dichlorotetrafluoroethane), fluorocarbon 115 (chloropentafluoroethane), and fluorocarbon 116 (hexafluoroethane); and other propellants such as hydrocarbons, including propane, n-butane and isobutane, and halohydrocarbons such as methylene chloride and vinyl chloride and other volatile organic materials, such as dimethyl ether. Preferably the bursting fluid is one that may be readily encapsulated by diffusion through capsule walls or by the simple coacervation process.

Microcapsules as described, containing one or more active substances and a bursting fluid may be incorporated in pressurized systems, such as aerosol systems with other similar microcapsules containing different active substances.

In most instances there will be a plurality of active substances present in the pressurized system at least one of which will be in pressurized microcapsules.

The pressurized composition is, of course, maintained in a container. As the product is discharged from the container, or as the container is opened to the atmosphere, the pressurized microcapsules upon reaching atmospheric pressure burst or explode due to the pressure of the encapsulated bursting fluid, and thereby release the encapsulated active substance to contact with the other active ingredients in the system. The active ingredients in contact with one another are then capable of reacting, or catalyzing a reaction, or otherwise combining, depending upon their desired function.

As in the examples briefly described above, the encapsulated active ingredient employed in this invention generally engages in a chemical reaction, after release upon rupture of the microcapsules at atmospheric pressure. However, there are other uses for the exploding microcapsules wherein the active ingredients are not chemically reactive.

It may be desirable, for example, to keep separate two or more mutually soluble components, as in a spatter paint where two or more differently colored, mutually soluble phases are used. Accordingly, pressurized microcapsules containing variously colored paints, as active ingredients, may be dispersed in a base paint, in a pressurized system. When this produce is sprayed onto a surface, the pressurized microcapsules explode to release tiny spots of color, which by dissolving into the continuous base paint phase form variously colored areas. A smooth continuous paint film results which is unique in texture, appearance and stability, when compared with existing multiphase spatter paints. By this method, it is possible to produce round spots of color on a background, or to run multicolored droplets down a surface.

Another area of utility for the invention, also not involving a chemical reaction, is to increase the stability of pressurized systems, such as aerosols. In such applications, pressurized microcapsules are employed to encapsulate a component, as the active substance, otherwise unstable in the pressurized system. For example, in water-based aerosol room deodorants, perfume may be encapsulated to prevent its deterioration during storage, as by reaction with other components of the aerosol system, or with the container and its linings or the like. The stabilized perfume is released by explosion of the microcapsules as the product is used.

There are numerous additional variations of the present concept which are intended to be included within the scope of the invention. Thus in one embodiment, a solid active agent, for example, benzoyl peroxide, a solid oxidant, may be encapsulated simultaneously with a volatile bursting liquid by the simple coacervation process. In carrying out tne encapsulation, the volatile bursting liquid, for example, a 50:50 mixture of fluorocarbons 11 and 12, is dispersed in an aqueous dispersion of a hydrophilic colloid, such as gelatin or starch. Then solid benzoyl peroxide is also dispersed into the aqueous dispersion, and the mixture is agitated to form an emulsion of the volatile liquid, with the solid oxidant particles occluded thereon. The colloid is then coacervated to form solid microcapsules containing the volatile liquid and solid oxidant. All of the above steps are performed under pressure, and the pressurized microcapsules are then packaged in a product container.

It is also within the scope of this invention to employ walled clusters of capsules, such as those described in U.S. Pat. No. 3,041,289. In such an embodiment, the clusters may include a plurality of different microcapsules, for example, one group of capsules might be pressurized and contain an active substance, while the other, also containing active substances, is not pressurized. In this case, the first group of capsules will instantly burst upon release, while the second group can be arranged to release more gradually, for example by dissolution of the capsule walls, to provide a sustained reaction. Such an arrangement is particularly appropriate in hot shaves, which now have the drawback of losing heat rapidly, since a sustained reaction such as above described will permit the shave cream to remain hot for a longer period.

The walls of the microcapsules prepared by conventional processes are typically porous to propellants such as the fluorocarbons listed above. This permits incorporation of volatile fluids or active ingredients by diffusion and displacement. But the wall porosity may allow as well premature release of the active ingredient, or diffusion of other active ingredients into the nuclei. Thus, it may be desirable to coat the microcapsules with an impermeable layer prior to use. Dual-walled capsules, as described in U.S. Pat. No. 2,969,331, may also be used. Such dual-walled capsules may be desired, for example, when the inner wall would be soluble in the aerosol product, with the outer wall in that case being insoluble or water-repellant. In addition, the pressurized microcapsules may be sealed by an inert outer wall, for example by dipping or vapor coating with aluminum, or by coating with glass.

The present invention involves the phenomenon by which pressurized microcapsules burst upon being subjected to atmospheric pressure. In accordance with the present invention microcapsules are formed containing a perfume encapsulated in colloidal gelatin hardened with formaldehyde by the simple coacervation process described in U.S. Pat. No. 2,800,458. The gelatin capsule walls are porous, and a volatile fluid, such as a fluorocarbon propellant, may be added to the microcapsules by the exchange process, simply by soaking in the volatile fluid. In this example, the microcapsules thus formed were soaked in 50:50 mixture of propellants 11 and 12, at about 37.5 psig., for about 24 hours. The pressurized microcapsules were then removed from the container and allowed to stand for a very short time at atmospheric pressure. After about 2 minutes, the microcapsules burst, releasing to the atmosphere the active perfume ingredient in the nuclei.

The following examples will illustrate embodiments of the present invention for some of the uses discussed generally above. Ratios and percentages are by weight, and temperature is about room temperature unless stated to be otherwise.

EXAMPLE I

In the example a hair dye is prepared by encapsulating one of the active ingredients in pressurized microcapsules, which are then stored in a pressurized aerosol system containing the remaining components of the dye. The dyes, in this case a combination of aromatic amines and phenols are stored in the system separately from the developer, potassium percarbonate, encapsulated in pressurized microcapsules.

The solid potassium percarbonate is encapsulated in a polyolefin in accordance with a method more completely set forth in U.S. Pat. No. 3,121,698. In this procedure, 5-micron or smaller potassium percarbonate particles are precoated with a water-soluble cellulose ether, by dispersing the particles in a solution of Klucel, a cellulose ether, with Cellosolve solvent, ethylene glycol monoethyl ether, and a spray drying the dispersion. Precoating the particles prevents the poisoning of the catalyst in the following polymerization step.

A 3,000 ml. reaction flask is flushed with nitrogen, and then charged under agitation with 1,800 ml. of toluene, 50 grams of the cellulose-coated potassium percarbonate particles, and 20 millimols of titanium tetrachloride. After 5 minutes 20 millimols of triethylaluminum are added. Ethylene gas is passed into the reaction mixture, and the temperature is raised to 65°C. For 3 hours the reaction is continued by the addition of ethylene as fast as it is used up. Then the reaction is stopped, and the product is filtered, washed with methanol and dried.

The polyolefin coating of the microcapsules at this point is not continuous, and the encapsulated potassium percarbonate may be leached out with a solvent, such as water, to provide space for a volatile fluid. The particles are leached by stirring in water at 60°C. until about 5 percent of the encapsulated potassium percarbonate is extracted. Then the microcapsules are dried and sintered to render the polyolefin coating continuous. The microcapsules are then slurried under pressure with a 50:50 mixture of liquid propellants 11 and 12, and maintained at 90°–125°F. under at least 110 psig. for at least 24 hours, whereby the volatile liquid propellant molecularly permeates the capsule walls and fills the leached voids of the microcapsules.

Finally the microcapsules are packaged in a conventional manner in an aerosol container with the dye intermediates, the aromatic amines and phenols, and other ingredients to complete the product, in the required stoichiometric proportions.

EXAMPLE II

In this example a hot shave cream in an aerosol container is prepared by encapsulating an oxidant, sodium percarbonate, as an active ingredient in pressurized microcapsules, and packaging the aerosol with the microcapsules dispersed in the remaining components of the product, including a reductant as the other active ingredient. Upon discharge of the product from the aerosol container, the microcapsules explode to release the oxidant, which in turn reacts exothermically with the reductant to provide sensible heat to the shave cream.

The sodium percarbonate is encapsulated in polyolefin microcapsules by substantially the same procedure used in Example I to encapsulate the potassium percarbonate; and the same volatile fluid, an equal mixture of propellants 11 and 12, is added to pressurize the microcapsules.

The product is packaged in a conventional manner as a shave cream, except that a reducing agent, a mixture of potassium sulfite and potassium thiosulfate, is added directly to the product, and the pressurized microcapsules containing the oxidant are dispersed therein, both active ingredients being in proper stoichiometric ratio and quantity to heat the shave cream to about 150°F. shortly after discharge from the aerosol.

EXAMPLE III

In this example the components of a polyurethane foam are packaged in a pressurized container, with one of the reactants encapsulated in pressurized microcapsules to prevent reaction until the discharge of the product from the container. The two primary reactants of the system are hexylene glycol and toluene diisocyanate. It is advantageous to encapuslate the diisocyanate because of its highly toxic nature.

The toluene diisocyanate is encapsulated by the interfacial polycondensation method, described in greater detail in British Pat. No. 1,091,141. A polyamide, a polyurethane or any other suitable wall material may be used. The procedure may be carried out in the following manner:

Into a flask containing 300 ml. of polyvinyl alcohol (Elvanol SO-42, containing 0.5 percent water), there is added rapidly a solution of 12 g. of sebacoyl chloride, 3 ml. of trimesoyl trichloride and 75 ml. of toluene diisocyanate containing 5 percent perfume, under agitation sufficiently strong to form a dispersion of tiny droplets. The agitation is reduced but maintained while there is added rapidly 50 ml. of distilled water containing 12 g. of ethylenediamine, 4.65 g. of 1,3,5-benzene triamine trihydrochloride, 2.4 g. of sodium hydroxide and 10 g. of sodium carbonate monohydrate. Slow agitation is continued for two hours. Then the microcapsules so formed are filtered, washed with acetone and dried.

The microcapsules are pressurized by diffusion to displace the encapsulated perfume with an equal mixture of propellants 11 and 12, in a closed container at about 100 psig. and 90°–125°F. for at least 72 hours. The volatile liquid propellant diffuses through the capsule wall to displace the perfume. The microcapsules are maintained under pressure until use.

Alternatively the toluene diisocyanate and the volatile propellant may be encapsulated simultaneously, by substituting the propellant for the perfume in the above procedure. The conditions of encapsulation remain the same except that the procedure is carried out under pressure sufficient to maintain the propellant as a liquid. Direct encapsulation in this manner of course eliminates the need for the diffusion step.

The encapsulated toluene diisocyanate is packaged in proper stoichiometric proportion with the hexylene glycol, and the remaining components of the polyurethane foam: water, catalysts, dispersing agents, fillers, emulsifiers, and other substances. Upon release of the product from the pressurized system, the microcapsules explode to release the diisocyanate, which in turn reacts with the glycol and water to form a polyurethane foam. Other reactants may also be used, and their choice as well as the choice and proportions of the remaining components will depend on the characteristics desired for the foam product.

EXAMPLE IV

In this example a spray-on nylon coating product is prepared and packaged in an aerosol container. The two separated active ingredients are adipoyl chloride and hexamethylenediamine. The hexamethylenediamine being somewhat soluble in water may be encapsulated by the organic phase separation method described more fully in U.S. Pat. No. 3,173,878.

Hexamethylenediamine containing 5 percent of a suitable perfume is dispersed by strong agitation into a 5 percent solution of ethyl cellulose in tetrachloroethylene. A 48 percent ethoxylated cellulose polymer (Hercules N-100), eventually to form the resin wall material, is added to the dispersion to provide a weight ratio of hexamethylenediamine to polymer of 5:1. One percent of sorbitain sesquioleate (Arlacel C) is also added to the dispersion as an emulsifying agent. Petroleum ether (65°–110°C) is slowly added to the dispersion, and the ethoxylated polymer precipitates about the dispersed amine droplets to form a profusion of tiny (0.5–5 microns) microcapsules. The resulting slurry is stirred and cooled to about 15°C. The microcapsules are then separated from the equilibrium liquid by decantation, and are hardened by gradual and progressive insolubilization of the ethyl cellulose by washing with petroleum ether successively until the effluent is substantially free of tetrachloroethylene. The hardened capsules are separated from the final wash by filtration, and dried.

The bursting fluid, an equal mixture of Freons 11 and 12, is added to pressurize the microcapsules by essentially the same method as employed in the above examples. The microcapsules are maintained dispersed in the liquid propellant at about 90°–125°F. and 100 psig. for at least 24 hours, while the propellant permeates the capsule walls to displace the perfume and pressurize the microcapsules. Also, as in the above examples, the pressurized microcapsules are maintained under sufficient pressure to prevent explosion until use.

The microcapsules containing as an active ingredient hexamethylenediamine are charged into a conventional aerosol container in proper proportion with adipoyl chloride, propellant and other ingredients to provide a spray-on nylon aerosol product.

EXAMPLE V

In this example an epoxy adhesive is prepared and packaged in an aerosol container. An active ingredient, a polyamide resin (Versamid), is encapsulated by the simple aqueous coacervation method, described more fully in U.S. Pat. No. 2,800,458, now U.S. Pat. No. Re. 24,899.

One gallon of a polyamide-in-water emulsion is prepared by combining two parts by weight of the polyamide containing 5 percent of a suitable perfume, and 100 parts of a solution of 10 percent pigskin gelatin in water and emulsifying the mixture until the polyamide droplets are about 2–5 microns in diameter. The emulsification takes place at 50°C. to prevent gelling of the gelatin. Continuing about 50°C., coacervation is induced by adding slowly and uniformly 0.4 gallon of a 20 percent sodium sulfate solution in water. The coacervate is then gelled, by pouring it with agitation into 10 gallons of 7 percent solution of sodium sulfate in water at 19°C. The resulting microcapsules are filtered and washed with water to remove the salt, at a temperature below the melting point of the gelatin. The microcapsules are then hardened by combining the filter cake with 2 gallons of a 37 percent solution of formaldehyde in water. The hardened mass of microcapsules is again filtered and washed to remove the residual formaldehyde. The resulting microcapsules are finally slurried in water and spray-dried to yield unagglomerated capsules.

The microcapsules are pressurized in a slurry with an equal mixture of propellants 11 and 12, at about 90°–125°F. and 100 psig., for at least 24 hours. The propellants permeate the capsule walls to displace the encapsulated perfume.

The encapsulated polyamide resin is combined under pressure with a bisphenol A epichlorohydrin-based epoxy resin (Genepoxide) and the remaining ingredients in an aerosol container to provide the epoxy adhesive product.

It will be noted that in the above examples the microcapsules are pressurized by contact with a liquid propellant at about 90°–125°F. This procedure accelerates the diffusion of the propellant into the microcapsules. Higher or lower temperatures (and pressures) may be employed, however, with a proportional effect on the rate of diffusion. Indeed, in some cases it may be possible to eliminate the pressurization step entirely, and to pressurize the microcapsules in the finished product containing a propellant. The success of this latter procedure will depend largely on the propellant concentration in the finished product, which will directly affect the rate of diffusion. It is preferred, nevertheless, to pressurize the microcapsules, as a separate step, by contact at elevated temperature with a liquefied volatile fluid.

What is claimed is:

1. A system for storing two active substances which are reactive with one another comprising an aerosol container containing said substances, a liquid aerosol propellant in said container under pressure and a multiplicity of microcapsules having solid walls in said container, at least some of said microcapsules containing an encapsulate consisting essentially of one of said active substances and a bursting fluid selected from the group consisting of fluorocarbons, hydrocarbons, methylene chloride, vinylchloride, dimethyl ether and mixtures thereof, said bursting fluid being present in an amount and having a vapor pressure such that the pressure inside said microcapsules is not substantially different from the pressure of said propellant in said container, but is sufficiently greater than the pressure prevailing outside said container under normal conditions of use to cause bursting of said capsules upon their discharge from said container, substantially all of said one substance in said container being in microcapsules.

2. The system claimed in claim 1 wherein the bursting fluid is trichlorofluoromethane, difluorodichloromethane, tetrafluoromethane, dichlorofluoromethane, chlorodifluoromethane, fluoroform, trichlorotrifluoroethane, dichlorotetrafluoroethane, chloropentafluoroethane, hexafluoroethane, or mixtures thereof.

3. The system claimed in claim 1 wherein the bursting fluid is propane, n-butane, i-butane, or mixtures thereof.

4. The system claimed in claim 1, wherein the bursting fluid is methylene chloride or dimethyl ether.

5. The pressurized system of claim 1, wherein the system contains a shave cream and at least two active substances which in combination are capable of reacting exothermically to provide sensible heat to the shave cream, at least one of said active substances being encapsulated in microcapsules.

6. The pressurized self-heating shave cream system of claim 5, wherein said active substances include an oxidant and a reducing agent.

7. The pressurized self-heating shave cream system of claim 6, wherein said oxidant is selected from the group consisting of sodium percarbonate and potassium percarbonate and is encapsulated within microcapsules having polyolefin walls, and wherein said bursting fluid comprises dichlorodifluoromethane.

8. The pressurized system of claim 1, wherein the system contains at least two active substances which in combination are capable of reacting to form a hair dye, at least one of said active substances being encapsulated in microcapsules.

9. The pressurized hair dye system of claim 8, wherein said active substances include at least one dye intermediate, selected from the group consisting of aromatic amines and aromatic phenols, and a developer selected from the group consisting of hydrogen peroxide, sodium percarbonate and potassium percarbonate, and wherein said developer is encapsulated in said pressurized microcapsules.

10. The pressurized system of claim 1, wherein the system contains active hair bleach component substances, comprising aqueous ammonia and hydrogen peroxide, at least one of said active substances being encapsulated in microcapsules.

11. The pressurized system of claim 1, wherein the system contains at least two active substances which in combination are capable of reacting to form an adhesive, at least one of said active substances being encapsulated in microcapsules.

12. The pressurized system of claim 11 wherein the bursting fluid is trichlorofluoromethane, difluorochloromethane, tetrafluoromethane, dichlorofluoromethane, chlorodifluoromethane, fluoroform, trichlorotrifluoroethane, dichlorofluoroethane, hexafluoroethane or mixtures thereof.

13. The pressurized system of claim 11 wherein the bursting fluid is propane, i-butane or n-butane or mixtures thereof.

14. The pressurized system of claim 11 wherein the active substances are capable of forming an epoxy adhesive.

15. The pressurized system of claim 1, wherein the system contains at least two active substances which are capable of reacting to form a polyurethane foam, at least one of said active substances being encapsulated in microcapsules.

16. The pressurized system of claim 1, wherein the system contains at least two active substances capable of reacting to form a nylon, at least one of said active substances being encapsulated in microcapsules.

17. The pressurized system of claim 1, wherein the system contains at least two active substances capable of reacting to form a polyurea, at least one of said active substances being encapsulated in microcapsules.

18. The pressurized system of claim 1, wherein the system contains a first paint encapsulated in microcapsules, and a second paint of a different color.

* * * * *